United States Patent Office 2,852,553
Patented Sept. 16, 1958

2,852,553

PRODUCTION OF NITROSOPHENYLAMINOACID ESTERS

John J. D'Amico, Charleston, and Ching C. Tung, Nitro, W. Va., assignors to Monsanto Chemical Company, St. Louis, Mo., a corporation of Delaware No Drawing. Application October 28, 1955
Serial No. 543,584

4 Claims. (Cl. 260—471)

This invention relates to a new class of compounds and to methods for their preparation.

The compounds of this invention are nitrosophenylaminoacids which may be represented by the general formula

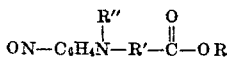

$$ON-C_6H_4N-R'-\overset{O}{\underset{\|}{C}}-OR$$
$$\phantom{ON-C_6H_4N-}{\underset{|}{R''}}\phantom{-C-OR}$$

where R represents an ester forming radical, as for example methyl, ethyl, propyl, isopropyl, butyl, isobutyl or amyl, R' represents an alkylene group, preferably ethylene, and R'' represents hydrogen or a nitroso group. The compounds of this class are valuable for catalyzing the modification of Butyl rubber by heat.

Nitrosophenylaminoacids may be prepared from the corresponding phenylaminoacids by treatment with cold nitrous acid and rearranging the intermediate N-nitroso compound in the manner well known for the preparation of p-nitrosoanilines. Nitrosation and rearrangement in one step has been described (U. S. 2,046,356) by treating an aromatic amine with nitrous acid under anhydrous conditions in the presence of excess hydrogen chloride which technique is also applicable to the N-phenylaminoacids. However, it was discovered that nitrosation, rearrangement, hydrolysis and esterification were effected simultaneously upon treating an anilinonitrile with nitrous acid in alcoholic solution containing dry hydrogen chloride. Anilinonitriles are available from cheap raw materials, therefore this method provides a cheap, direct synthesis of nitrosophenylaminoacids.

A solution of hydrogen chloride in methanol of approximately 30% concentration was prepared by diluting 158 grams of a methanol solution containing 1.5 gram moles of hydrogen chloride with 25 grams of methanol. The solution was cooled to 3° C. and stirred while 36.6 grams (0.25 mole) of anilinopropionitrile was slowly added thereto at 3–10° C. The mixture was then cooled to 5° C. and 20 grams (0.28 mole) of 97% sodium nitrite added in one portion. The reaction mixture was cooled to 0° C. and stirred while the temperature was allowed to rise slowly. A precipitate soon formed and after about 23 minutes the heat of reaction brought the temperature up to 40° C. The reaction mixture was then cooled to 30° C., stirred for about 3 hours at 25–30° C., then poured into 1500 grams of ice water and stirred thoroughly for 15 minutes. To the solution resulting from stirring with ice water 80 grams of concentrated ammonium hydroxide was added slowly until the pH was 8. Stirring was continued for about an hour, then the precipitate filtered, washed with water and dried. A 92.3% yield of methyl N-(p-nitrosophenyl) beta-alanine, M. P. 102–7° C. was obtained. After one recrystallization from alcohol the melting point was 108–109° C. Analysis gave 13.31% nitrogen compared to 13.41% calculated for $C_{10}H_{12}N_2O_3$. The same product was prepared from pure methyl N-phenyl beta-alanine by nitrosation and rearrangement.

The ester group may be varied by substituting other alcohols for methanol, as for example ethanol, propanol, butanol or even higher alcohols. It will be appreciated that the reaction may also be carried out stepwise, i. e. by hydrolyzing the nitrile to the ester and then treating with nitrous acid. Butyl N-(p-nitrosophenyl) beta-alanine was prepared in this manner by adding sodium nitrite to a solution of butyl beta-anilinopropionicacid in butanol containing dry hydrogen chloride. In place of hydrogen chloride phosphorus trichloride, phosphorus oxychloride, sulfur dichloride or silicon tetrachloride may be used. The intermediate was prepared as follows:

A mixture of 100 grams of beta-anilinopropionitrile and 515 grams of a 29% solution of hydrogen chloride in n-butanol was stirred at 10–15° C. for about 4 hours. The hydrogen chloride salt was separated by filtration, washed with ether, air dried and dissolved in a liter of water. Upon neutralization with ammonium hydroxide an oil layer separated which was extracted with 500 ml. of ether, washed with water and the ether solution dried over anhydrous sulfate. Upon removal of the solvent butyl beta-anilinopropionicacid was obtained in 73.2% yield. Analysis gave 6.78% nitrogen as compared to 6.34% calculated for $C_{13}H_{19}NO_2$.

Reacting the nitrosophenylaminoacids with cold nitrous acid yields dinitroso products. The following procedure was found to be satisfactory: A solution containing 24.3 grams of concentrated hydrochloric acid in a liter of water was cooled to 5° C. and to it added 42 grams of methyl N-(p-nitrosophenyl) beta-alanine. The mixture was stirred until a clear solution resulted and then cooled to 0° C. A solution of 14.4 grams of 97% sodium nitrite in 60 ml. of water was added slowly while keeping the reaction mixture at about 0° C. The greenish-yellow solid was filtered, washed with water until neutral and dried. An 89.5% yield of methyl N-nitroso N-(p-nitrosophenyl) beta-alanine was obtained. The melting point after one recrystallization from methanol was 60–61° C. Analysis gave 17.6% nitrogen as compared to 17.7% calculated for $C_{10}H_{11}N_3O_4$.

It is intended to cover all changes and modifications of the examples of the invention herein chosen for purposes of disclosure which do not constitute departures from the spirit and scope of the invention.

What is claimed is:

1. The process of preparing nitrosophenylalanine esters which comprises treating beta-anilinopropionitrile with nitrous acid in cold anhydrous alcoholic solution of hydrogen chloride.

2. The process of preparing nitrosophenylalanine esters which comprises treating beta-anilinopropionitrile with nitrous acid in cold anhydrous alcoholic solution of hydrogen chloride, stirring the reaction mixture while allowing the temperature to rise, diluting with water and neutralizing.

3. The process of preparing nitrosophenylalanine esters which comprises adding a slight excess of sodium nitrite to one mole of anilinopropionitrile and five moles of concentrated hydrogen chloride in anhydrous methanol, keeping the temperature below about 10° C., allowing the temperature to rise slowly while stirring, then stirring with water, neutralizing and separating the nitrosophenylalanine ester.

4. The process of preparing p-nitrosophenylalanine esters directly from the nitrile without isolating intermediates which comprises the steps of hydrolyzing beta-anilinopropionitrile with an anhydrous alcoholic solution of hydrogen chloride, nitrosating and rearranging by adding sodium nitrite to the anhydrous alcohol-hydrogen chloride reaction mixture and isolating the nitrosated product, each step being carried out below 40° C.

(References on following page)

References Cited in the file of this patent

FOREIGN PATENTS

| | | |
|---|---|---|
| 134,986 | Germany | Oct. 8, 1902 |
| 541,328 | Great Britain | Nov. 24, 1941 |

OTHER REFERENCES

Hickinbottom: "Reactions of Organic Compounds," pp. 282-3 (1948).